United States Patent
Kamiya

(10) Patent No.: US 9,582,951 B2
(45) Date of Patent: Feb. 28, 2017

(54) VEHICULAR SYSTEM, VEHICLE SIDE UNIT, AND MOBILE DEVICE

(71) Applicant: DENSO CORPORATION, Kariya, Aichi-pref. (JP)

(72) Inventor: Hodaka Kamiya, Obu (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/767,005

(22) PCT Filed: Jan. 22, 2014

(86) PCT No.: PCT/JP2014/000300
§ 371 (c)(1),
(2) Date: Aug. 11, 2015

(87) PCT Pub. No.: WO2014/125768
PCT Pub. Date: Aug. 21, 2014

(65) Prior Publication Data
US 2015/0371472 A1    Dec. 24, 2015

(30) Foreign Application Priority Data
Feb. 12, 2013 (JP) .................. 2013-024856

(51) Int. Cl.
*G07C 9/00* (2006.01)
*B60R 25/24* (2013.01)

(52) U.S. Cl.
CPC .......... *G07C 9/00309* (2013.01); *B60R 25/24* (2013.01); *B60R 2325/20* (2013.01); *G07C 2209/63* (2013.01)

(58) Field of Classification Search
None
See application file for complete search history.

(56) References Cited

U.S. PATENT DOCUMENTS

| 2006/0186996 A1 | 8/2006 | Sato | |
| 2008/0231417 A1* | 9/2008 | Kurpinski | B60R 25/2036 340/5.72 |
| 2009/0066477 A1* | 3/2009 | Kaihori | B60R 25/2072 340/5.72 |

FOREIGN PATENT DOCUMENTS

| JP | 2006233535 A | 9/2006 |
| JP | 2007063800 A | 3/2007 |

(Continued)

OTHER PUBLICATIONS

International Search Report and Written Opinion (in Japanese with English Translation) for PCT/JP2014/000300, mailed Apr. 22, 2014; ISA/JP.

*Primary Examiner* — Daniell L Negron
(74) *Attorney, Agent, or Firm* — Harness, Dickey & Pierce, P.L.C.

(57) ABSTRACT

A vehicular system includes a vehicle side unit and mobile devices registered to the vehicle side unit. The vehicle side unit transmits a first request signal designating a first mobile device. A replying section of the first mobile device replies a response signal when receiving the first request signal. A replying section of a second mobile device replies a non-designated report signal when receiving the first request signal at a time point different from a time point at which the first mobile device replies the response signal. The vehicle side unit includes a vehicle side receiving section receiving the signal transmitted from the replying section of each mobile device and a locked-in determiner determining that only the first mobile is locked in the compartment of the vehicle when the response signal from the first mobile device is received and the non-designated report signal is not received.

10 Claims, 7 Drawing Sheets

(56) References Cited

FOREIGN PATENT DOCUMENTS

| | | |
|---|---|---|
| JP | 2010077887 A | 4/2010 |
| JP | 2011247076 A | 12/2011 |

* cited by examiner

VEHICULAR SYSTEM, VEHICLE SIDE UNIT, AND MOBILE DEVICE

CROSS REFERENCE TO RELATED APPLICATIONS

This application is a U.S. National Phase Application under 35 U.S.C. 371 of International Application No. PCT/JP2014/000300 filed on Jan. 22, 2014 and published in Japanese as WO 2014/125768 A1 on Aug. 21, 2014. This application is based on and claims the benefit of priority from Japanese Patent Application No. 2013-024856 filed on Feb. 12, 2013. The entire disclosures of all of the above applications are incorporated herein by reference.

TECHNICAL FIELD

The present disclosure relates to a vehicular system in which a mobile device responds to a signal transmitted from a vehicle side unit via a wireless communication, and also relates to the mobile device and the vehicle side unit included in the vehicular system.

BACKGROUND ART

A vehicular system controlling lock or unlock of a door of a vehicle has been known. This kind of vehicular system controls a state switch between a lock state and an unlock state of each door of the vehicle according to an ID code comparison result between a mobile device, such as an electronic key, and a vehicle side unit via a wireless communication. This kind of system also permits an engine start under a condition that a person who carries the mobile device is in a compartment of the vehicle.

Technologies for avoiding locking the door with a mobile device left in the vehicle have been proposed for above-described vehicular system. Specifically, when multiple mobile devices are registered to one vehicle, the user may lock the door with one or more registered mobile devices left in the vehicle (for example, refer to patent literature 1).

In order to solve above-described difficulty, patent literature 1 discloses a vehicular system which determines the door lock with the mobile device left in the vehicle. Specifically, the vehicle side unit transmits a request signal to the inside space of the vehicle compartment. When the vehicle side unit receives a response signal from the registered mobile device, the vehicle side unit determines the door lock with the mobile device left in the vehicle.

In patent literature 1, the vehicle side unit transmits, as the request signal, ID code or key number code indicating key number. When a mobile device corresponding to the code transmitted as the request signal exists in the vehicle compartment, the mobile device returns a response signal. When the response signal is transmitted from the mobile device, the vehicle side unit determines the presence of the mobile device, which has the same code with the code transmitted in the request signal, in the vehicle. In patent literature 1, the vehicular system carries out the process (hereinafter, determination process), which determines whether the mobile device is left in the vehicle, for all of the registered mobile devices in order to determine the presence of each mobile device in the vehicle compartment. In the determination process, the request signal is transmitted to the mobile device, and the presence of the mobile device is determined based on whether the response signal is transmitted from the mobile device in response to the request signal.

In the vehicular system disclosed in patent literature 1, it takes quite a long time for determining the presence of all of the registered mobile devices in the vehicle compartment. The following will describe the details.

The mobile device transmits the response signal as a response only when the request signal transmitted from the vehicle side unit designates the mobile device itself. For determining the presence of all of the registered mobile devices in the vehicle compartment, the vehicle side unit needs to perform above-described determination process to each of the registered mobile devices in a predetermined order even in a case where only one mobile device (hereinafter, referred to as registered mobile device) that is registered to the vehicle exists in the vehicle. Thus, the vehicular system disclosed in patent literature 1 always requires quite a long time for determining the presence of all of the registered mobile devices in the vehicle compartment. That is, the vehicular system always requires a certain time period for performing the determination process for all of the registered mobile devices regardless of the actual number of the mobile devices that remain in the vehicle compartment.

PRIOR ART LITERATURES

Patent Literature

Patent literature 1: JP 2010-77887 A

SUMMARY OF INVENTION

In view of the foregoing difficulties, it is an object of the present disclosure to provide a vehicular system, a vehicle side unit, and a mobile device, each of which reduces a determination time required for determining presence of all of the registered mobile devices in a vehicle compartment.

According to first aspect of the present disclosure, a vehicular system includes a vehicle side unit equipped to a vehicle and multiple mobile devices preliminarily registered to the vehicle side unit. The multiple mobile devices at least include a first mobile device and a second mobile device. The vehicle side unit includes an in-compartment transmitting section that has a communication area covering an inside space of a compartment of the vehicle and transmits a first request signal designating the first mobile device. Each of the multiple mobile devices includes a replying section. The replying section of the first mobile device replies a response signal when receiving the first request signal. The replying section of the second mobile device replies a predetermined non-designated report signal when receiving the first request signal. The replying section of the second mobile device replies the non-designated report signal at a time point earlier or later than a time point at which the replying section of the first mobile device replies the response signal by a predetermined time period. The vehicle side unit further includes a vehicle side receiving section receiving the signal transmitted from the replying section of each of the multiple mobile devices and a locked-in determiner. The locked-in determiner determines that, among the multiple mobile devices, only the first mobile is locked in the compartment of the vehicle when the vehicle side receiving section receives the response signal from the first mobile device in response to the first request signal and the non-designated report signal is not received by the vehicle side receiving section.

With above system, a determination time required for determining presence of all of the registered mobile devices in the vehicle compartment can be reduced.

According to second aspect of the present disclosure, a vehicle side unit, which is used in the vehicular system according to the first aspect, determines presence of one or more registered mobile devices in the vehicle compartment based on the signals replied by the replying section of each mobile device registered to the vehicle side unit.

With above vehicle side unit, a determination time required for determining presence of all of the registered mobile devices in the vehicle compartment can be reduced.

According to third aspect of the present disclosure, a mobile device, which is registered to the vehicle side unit and is used in the vehicular system according to the first aspect, transmits different response signals based on a determination whether the first request signal transmitted from the vehicle side unit designates the mobile device itself or not.

As described above, the mobile device transmits different response signals based on a determination result whether the first request signal designates the mobile device itself or not. Thus, when determining the presence of all of the mobile devices in the vehicle compartment, the vehicle side unit is able to reduce the determination time required for determining presence of all of the mobile devices in the vehicle compartment.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

The following will describe embodiments of the present disclosure with reference to the drawings.

First Embodiment

Figure 1:
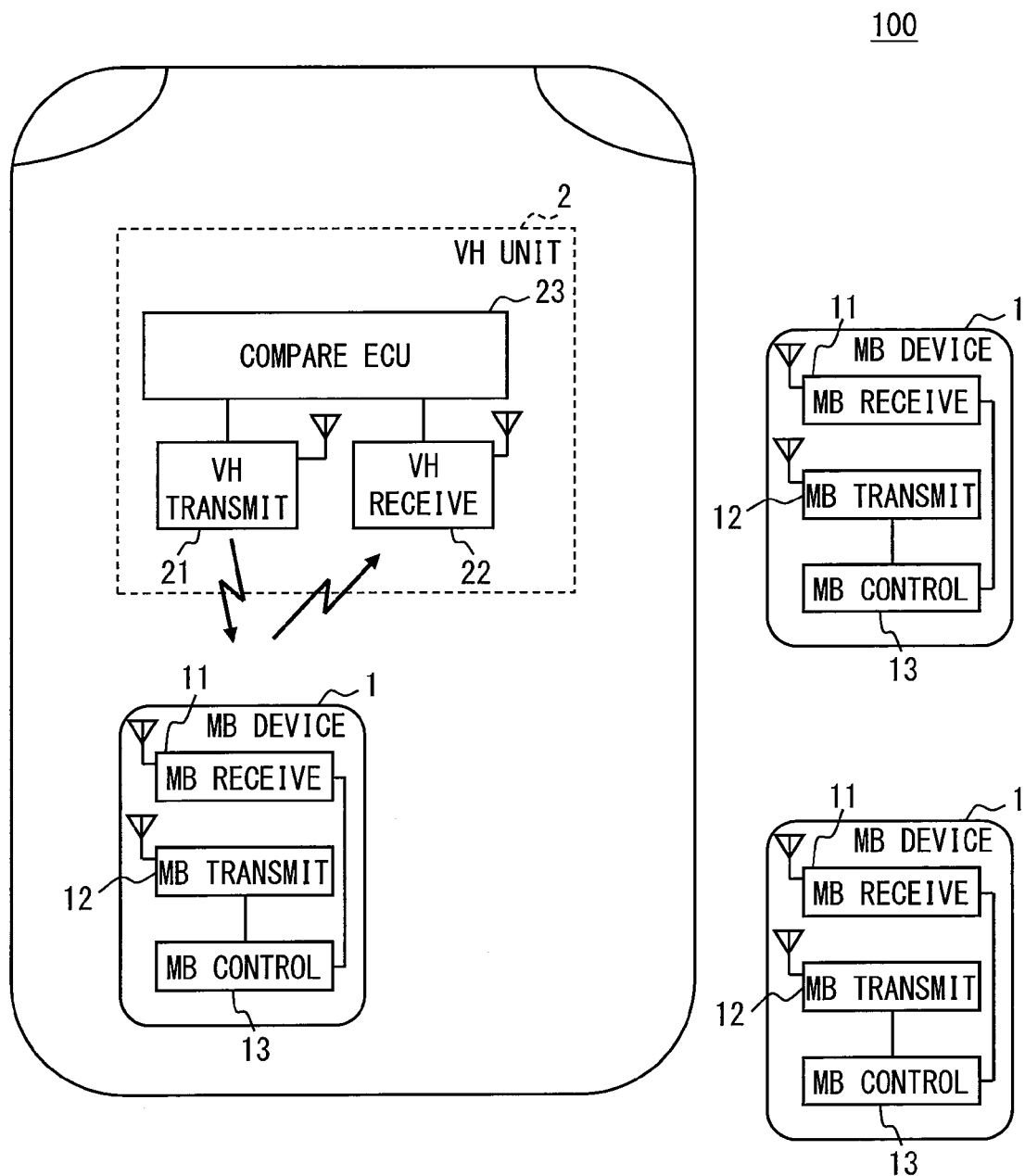
FIG. 1 is a diagram showing an example of a schematic configuration of a vehicular system according to an embodiment of the present disclosure.

In the present embodiment, the vehicular system 100 is realized as a function of a smart entry system. FIG. 1 shows an example of a schematic configuration of the vehicular system 100. The vehicular system 100 includes mobile devices (MB DEVICE) 1 and a vehicle side unit (VH UNIT) 2 equipped to a vehicle. The vehicular system 100 controls door lock or door unlock for each door according to an ID code comparison result between the mobile devices 1 and the vehicle side unit 2. The ID code comparison is carried out by a communication between mobile devices 1 and the vehicle side unit 2.

The vehicle side unit 2 performs a control to permit an engine start and engine shutdown according to the ID code comparison result. In the present embodiment, a vehicular system 100 having three mobile devices 1 will be described as an example. The three mobile devices 1 are preliminarily registered to the vehicle side unit 2 of the vehicle.

Figure 2:
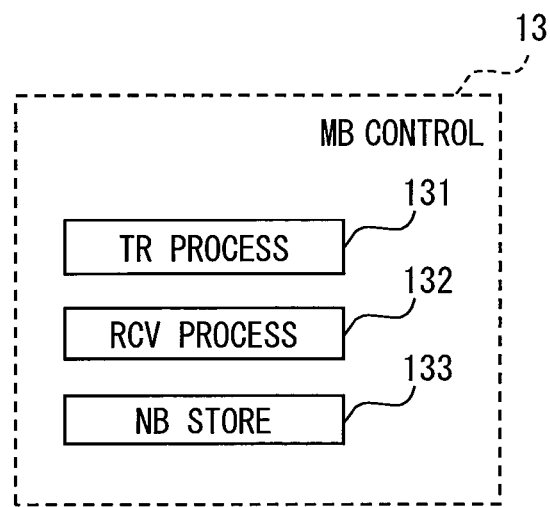
FIG. 2 is a block diagram showing an example of schematic functional blocks of a mobile controller.

The following will describe the mobile device 1 with reference to FIG. 2. As shown in FIG. 1, the mobile device 1 includes a receiving section (MB RECEIVE) 11, a transmitting section (MB TRANSMIT) 12, and a mobile controller (MB CONTROL) 13. The receiving section 11 receives a request signal from the vehicle side unit 2. The transmitting section 12 transmits a signal according to an instruction outputted from the mobile controller 13. For example, the transmitting section 12 may transmit ID code or non-target response code as the response signal. The non-target response code will be described later.

The mobile controller 13 is mainly provided by a microcomputer, which includes CPU, ROM, RAM, backup RAM, I/O (none of them is shown). The mobile controller 13 performs various processes by executing various control programs stored in the ROM. As shown in FIG. 2, the mobile controller 13 includes a transmitting processor (TR PROCESS) 131, a receiving processor (RCV PROCESS) 132, and a number storage (NB STORE) 133 as functional blocks.

As described above, the vehicular system 100 includes three mobile devices 1. Each mobile device 1 has similar electric configuration with one another. Further, each mobile device 1 has an ID code for identifying itself. The ID code of one mobile device 1 is different from one another, and is used when responding to the request signal transmitted from the vehicle side unit 2. The ID code of the mobile device 1 may be stored in an electrically rewritable nonvolatile memory, such as backup RAM.

The mobile device 1 further includes a lock switch and an unlock switch, which are not shown in the drawing. When a user manipulates the lock switch or the unlock switch, the mobile device 1 transmits a lock command signal or an unlock command signal to the vehicle side unit 2. Each of the lock command signal and the unlock command signal includes above-described ID code of the mobile device 1. When the vehicle side unit 2 determines a verification of the ID code comparison is successful, the door lock or the door unlock can be carried out corresponding to the lock command signal or the unlock command signal. As described above, the vehicular system 100 according to the present embodiment has wireless lock function and wireless unlock function.

The following will describe the vehicle side unit 2 with reference to FIG. 1. Hereinafter, the vehicle equipped with the vehicle side unit 2 is referred to as a subject vehicle. The vehicle side unit 2 includes a vehicle side transmitter (VH TRANSMIT) 21 equipped in the vehicle compartment, a vehicle side receiver (VH RECEIVE) 22, and a comparing ECU (COMPARE ECU) 23. The vehicle side unit 2 is well known unit for realizing functions of the smart entry system. The vehicle side unit 2 may further include a transmitter equipped at an outside portion of the vehicle compartment. In the present disclosure, the description of the transmitter equipped outside of the vehicle compartment will be omitted. Among various processes executed by the vehicle side unit 2 for providing functions of the smart entry system, description of processes for providing smart entry system functions that are not related to the present disclosure will be omitted.

The vehicle side transmitter 21 is disposed at an inside portion of the compartment of the subject vehicle. The vehicle side transmitter 21 transmits a request signal based on a transmission command signal output from the comparing ECU 23. A communication area of the vehicle side transmitter 21 with the mobile device 1 is configured to cover an inside space of the vehicle compartment at a time when the door on driver seat side of the subject vehicle is opened or closed, at a time when the engine is started, or at a time when the doors of the subject vehicle are locked. The vehicle side transmitter detects the presence of the mobile device 1 in the vehicle compartment.

The vehicle side transmitter 21 may include a front transmitter, a rear transmitter, and a trunk transmitter. The front transmitter has a communication area mainly covering front seats in the compartment of the subject vehicle. The rear transmitter has a communication area mainly covering rear seats in the compartment of the subject vehicle. The trunk transmitter has a communication area mainly covering an inside space of a trunk of the vehicle. In this case, communication areas of the front transmitter, the rear transmitter, and the trunk transmitter are combined as a total communication area, and the total communication area cover the whole vehicle compartment, which include the trunk compartment.

The vehicle side receiver 22 is disposed in the compartment of the subject vehicle. The vehicle side receiver 22 switches to a signal receivable state in synchronization with an output of the transmission command signal from the comparing ECU 23. The vehicle side receiver 22 receives the response signal transmitted from the mobile device 1. When receiving the response signal, the vehicle side receiver 22 outputs the response signal to the comparing ECU 23.

Figure 3:
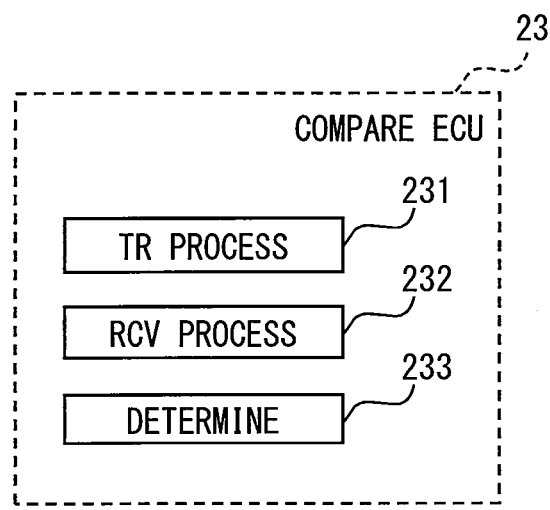
FIG. 3 is a block diagram showing an example of schematic functional blocks of a comparing ECU.

The comparing ECU 23 is mainly provided by a microcomputer, which includes CPU, ROM, RAM, backup RAM, I/O (none of them is shown). The comparing ECU 23 performs various processes by executing various control programs stored in the ROM. As shown in FIG. 3, the comparing ECU 23 includes a transmitting processor (TR PROCESS) 231, a receiving processor (RCV PROCESS) 232, and a locked-in determiner (DETERMINE) 233 as functional blocks.

ID codes of respective mobile devices 1 carried by authorized users of the subject vehicle are preliminarily registered in the comparing ECU 23. Further, the ID codes are registered in the comparing ECU 23 in relation to respective mobile devices 1. The ID codes of the mobile devices 1 may be stored in an electrically rewritable nonvolatile memory, such as backup RAM. When registering the mobile devices 1 carried by authorized users of the subject vehicle to the comparing ECU, the ID codes of respective mobile device 1 are registered in the comparing ECU 23. The registration of the mobile devices 1 carried by the authorized users to the comparing ECU 23 may be performed using a known method.

When registering the ID code of the mobile device 1 to the comparing ECU 23, for example, a number (hereinafter, referred to as registration number) may be assigned to each of the mobile devices 1. In the present embodiment, numbers "1", "2", and "3" are assigned to three mobile devices 1, respectively. The comparing ECU 23 also stores the registration number in relation to the ID code of each mobile device 1 in the nonvolatile memory.

When registering the mobile device 1 to the comparing ECU 23, the mobile device 1 also stores the registration number of itself in the number storage 133, which is provided by an electrically rewritable nonvolatile memory, such as backup RAM. The registration number is also referred to as key number code.

The comparing ECU 23 compares the ID code included in the response signal transmitted from the mobile device 1 with the ID code that is preliminarily stored in the comparing ECU 23. The comparing ECU 23 performs, according to the ID code comparison result, control to a switch of door lock state and door unlock state. Further, the comparing ECU 23 performs, according to the ID code comparison result, control to permit an engine start or engine shutdown.

When the user uses the smart entry system to lock each door of the subject vehicle, as disclosed in patent literature 1, the mobile device 1 is assumed to be not locked in the vehicle compartment. However, when the user uses adjunct mechanical key or the lock switch provided to the mobile device 1 to look each door of the subject vehicle, the door may be locked even though the mobile device 1 is left in the vehicle compartment. As described above, the mobile device 1 may be locked in the vehicle compartment.

Under an assumption that the mobile device 1 is locked in the vehicle compartment as described above, the comparing ECU 23 determines a presence of the mobile device 1 in the vehicle compartment. When the comparing ECU 23 determines a mobile device 1 is locked in the vehicle compartment, the comparing ECU 23 performs a comparison process within the vehicle compartment for specifying the mobile device 1 locked in the vehicle compartment.

Figure 4:
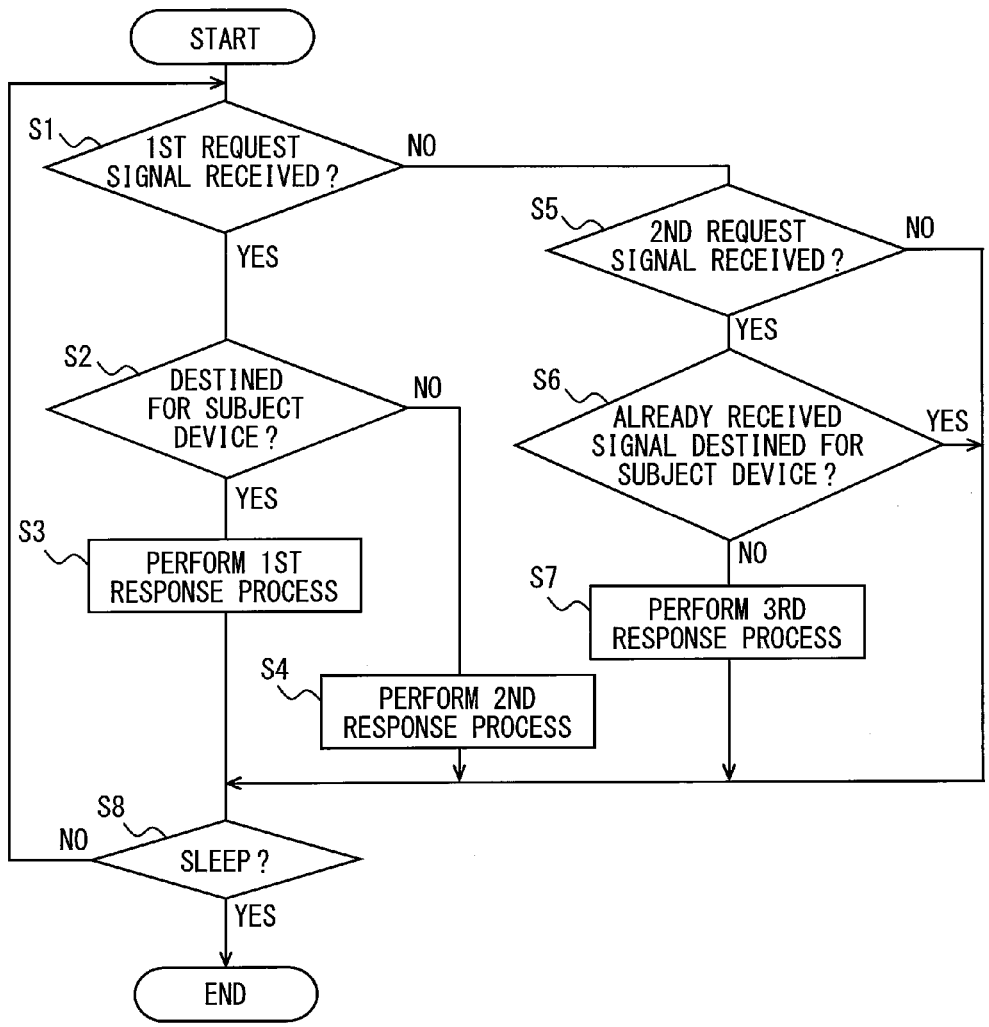
FIG. 4 is a flowchart showing an example of a response process executed by a mobile controller of a mobile device according to a first embodiment.

The following will describe the comparison process executed by the comparing ECU 23 within the vehicle compartment. First, a response process executed by the mobile controller 13 of the mobile device 1 will be described. FIG. 4 shows a flowchart of an example of the response process executed by the mobile controller 13 of the mobile device 1.

The process shown in FIG. 4 may be configured to start when the receiving processor 132 receives a wakeup signal from the vehicle side unit 2 via the receiving section 11 and the receiving processor 132 wakes up the mobile device 1 from a sleep state to a wakeup state. For restricting battery consumption, the mobile device 1 is configured to enter the sleep state when no communication is carried out for a predetermined period. In the communication between the mobile device 1 and the vehicle side unit 2, the information is modulated under a predetermined modulation method, and the modulated information is demodulated at a reception side.

At S1, when the receiving processor 132 receives a first request signal from the vehicle side unit 2 via the receiving section 11 (S1: YES), the receiving processor 132 proceeds to S2. When the receiving processor 132 fails to receive the first request signal (S1: NO), the receiving processor 132 proceeds to S5. The first request signal includes the ID code and registration number of a mobile device 1 designated by the first request signal. That is, the first request signal is a request signal which designates a specified mobile device 1. The specified mobile device 1 designated by the first request signal is also referred to as a first mobile device, and other mobile devices are referred to as second mobile devices.

At S2, the receiving processor 132 determines whether the specified mobile device 1 designated by the received first request signal is the mobile device 1 itself (that is, determines whether the destination of the request signal is the mobile device 1 itself). When the receiving processor 132 determines the destination of the first request signal is the mobile device 1 itself (S2: YES), the receiving processor 132 proceeds to S3. When the receiving processor 132 determines the destination of the first request signal is not the mobile device 1 itself (S2: NO), the receiving processor 132 proceeds to S4.

Whether the destination of the first request signal is the mobile device 1 itself or not may be determined based on a comparison result of the registration number included in the first request signal with the registration number stored in the number storage 133 of the mobile device 1 itself. Further, whether the destination of the first request signal is the mobile device 1 itself or not may be determined based on a comparison result of the ID code included in the first request signal with the ID code of the mobile device 1 itself.

At S3, the transmitting processor 131 performs a first response process, and proceeds to S9. The transmitting processor 131 functions as a replying section. In the first response process, for example, the transmitting processor 131 may transmit, via the transmitting section 12, the ID code of own mobile device 1 to the vehicle side unit 2 at a first predetermined time point. For example, the first predetermined time point may be set as a time point immediately after a receiving of the first request signal is completed. The ID code of the mobile device 1 transmitted in the first response process corresponds to a response signal.

As another example, the mobile device 1 may transmit the registration number to the vehicle side unit 2. In this case, the vehicle side unit 2 may transmit a further transmission request for the ID code to the mobile device 1 as a response to the transmission of the registration number. Then, the mobile device 1 may transmit the ID code to the vehicle side unit 2 in response to the transmission request for the ID code. This configuration may also be applied to the transmission of the ID code in other cases.

At S4, the transmitting processor 131 performs a second response process, and proceeds to S8. In the second response process, the transmitting processor 131 may transmit, via the transmitting section 12, a response purpose signal (also referred to as non-target response code) to the vehicle side unit 2. The non-target response code is a code prepared for response purpose when the mobile device 1 receives the first request signal designating another mobile device 1 different from itself. The non-target response code may be set the same in all of the mobile devices 1. That is, the mobile devices 1 may use a common non-target response code. In the second response process, the transmitting processor 131 is configured to transmit the non-target response code to the vehicle side unit 2 at a second predetermined time point. Herein, the second predetermined time point is a time point later than the first predetermined time point by a predetermined time period. The non-target response code transmitted in the second response process corresponds to a non-designated report signal.

The communication area of the vehicle side transmitter 21 usually covers only a few meters around the transmitter. Thus, when multiple mobile devices 1 are included in the communication area of the vehicle side transmitter 21, the mobile devices 1 receive the first request signal at approximately same time point. Thus, when the mobile devices 1 that are not designated by the first request signal receive the first request signal, all of the non-designated mobile devices 1 return the same signal to the vehicle side unit 2 at approximately same time point.

As another example, in the second response process, the second predetermined time point at which the non-target response code is transmitted may also be sent earlier than the first predetermined time point by a predetermined time period.

At S5, when the receiving processor 132 receives a second request signal transmitted from the vehicle side unit 2 via the receiving section 11 (S5: YES), the receiving processor 132 proceeds to S6. When the receiving processor 132 fails to receive the second request signal (S5: NO), the receiving processor 132 proceeds to S8.

The second request signal designates all of the registered mobile devices 1 other than the specified mobile device 1. The specified mobile device 1 is the mobile device 1 that replies the ID code of itself to the vehicle side unit 2 as a response to the first request signal in the first response process. For example, the second request signal may include respective ID codes and respective registration numbers of all of the mobile devices 1 except the ID code and registration number of the specified mobile device 1. Further, the second request signal may include respective ID codes and respective registration numbers of all of the mobile devices 1 and additionally include the ID code and the registration number of the mobile device 1 to be excluded.

At S6, the transmitting processor 131 determines whether the mobile device 1 has received the first request signal destined for itself. When the transmitting processor 131 determines that the mobile device 1 has received the first request signal destined for itself (S6: YES), the transmitting processor 131 proceeds to S8. When the transmitting processor 131 determines that the mobile device 1 has not received the first request signal destined for itself (S6: NO), the transmitting processor 131 proceeds to S7.

At S7, the transmitting processor performs a third response process, and proceeds to S8. For example, in the third response process, the transmitting processor 131 transmits, via the transmitting section 12, the ID code of own mobile device 1 to the vehicle side unit 2. Herein, the transmitting processor 131 transmits the ID code at a time point defined based on the registration number. The ID code transmitted in the third response process also corresponds to the response signal.

For example, when the registration number stored in the number storage 133 has a smaller value, the transmitting processor 131 may transmit the ID code of own mobile device 1 at an earlier time point. For another example, the transmitting processor 131 may delay the transmission of the ID code of own mobile device 1 by a time period corresponding to the value of the registration number after receiving the second request signal.

When the second request signal includes all of the registration numbers of the designated mobile devices 1, the transmitting processor 131 may calculate a ranking of the registration number of own mobile device 1 among the multiple registration numbers. The transmitting processor 131 is configured to transmit the ID code of own mobile device 1 at an earlier time when the registration number has a higher ranking, that is, has a smaller value. For example, suppose that the registration numbers of the mobile devices 1 designated by the second request signal are "1", "3", and "4". When the mobile device 1 has the registration number of "3", the ranking of the mobile device 1 is calculated as second position. With above configuration, a time period for waiting the response from the mobile device 1 that has not been designated by the second request signal can be saved.

As described above, when there exists multiple mobile devices 1 that perform the third response process, each mobile device 1 transmits the ID code at a different time with one another in successive order. As another example, the transmitting processor 131 may be configured to transmit the ID code of own mobile device 1 at an earlier time when the registration number has a larger value.

At S8, when the mobile device 1 performs no communication with the vehicle side unit 2 for a predetermined time period and enters the sleep state (S8: YES), the process is ended. When the mobile device 1 maintains the wakeup state without entering the sleep state (S8: NO), the process shown in FIG. 7 returns S1 and repeatedly executed.

Figure 5:
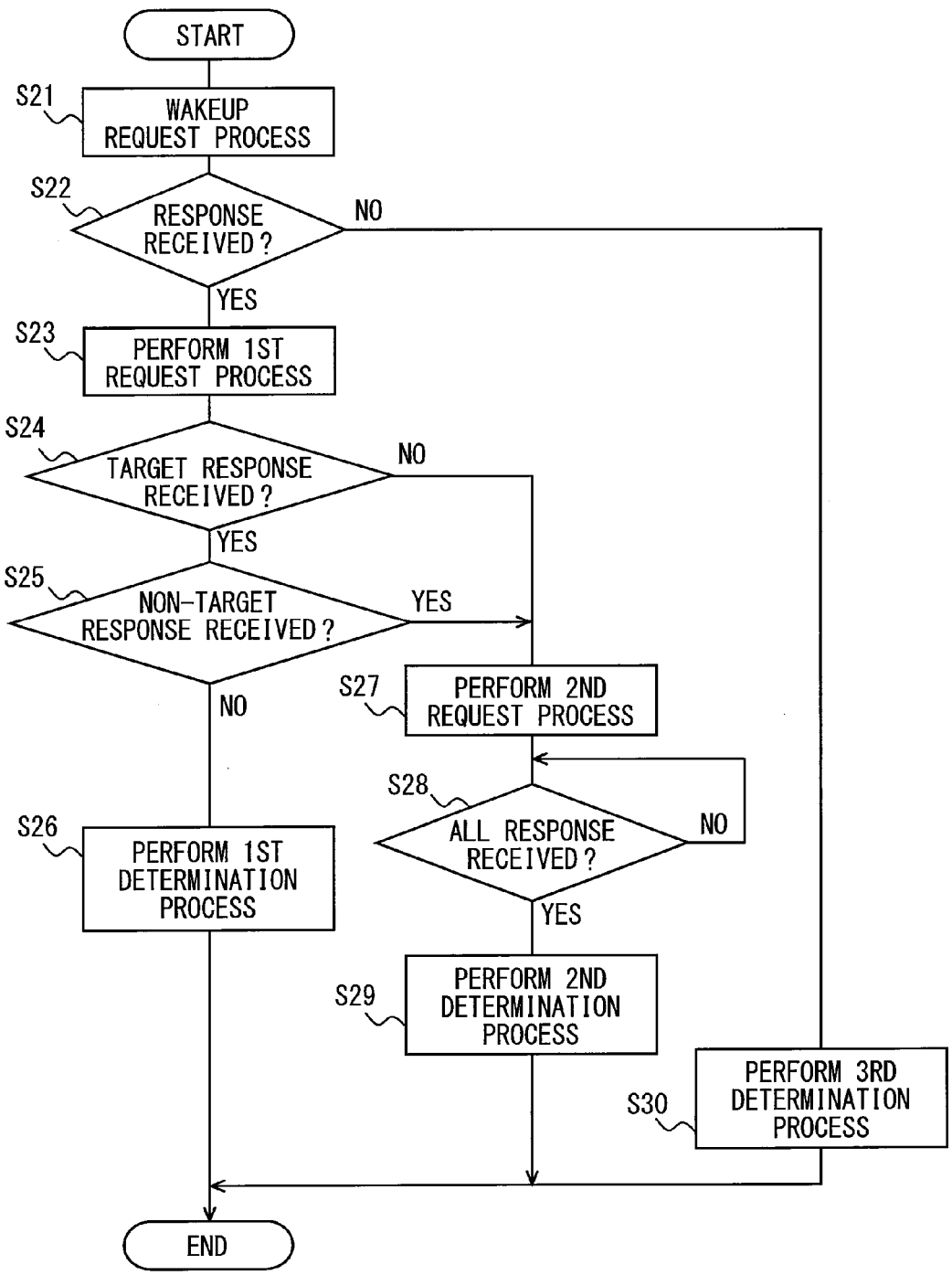
FIG. 5 is a flowchart showing an example of a comparison process executed, in the vehicle compartment, by a comparing ECU of a vehicle side unit according to the first embodiment.

The following will describe an example of the comparison process executed by the comparing ECU 23 of the vehicle side unit 2 in the vehicle compartment with reference to FIG. 5. The process shown in FIG. 5 may be configured to start when each door of the vehicle is locked using the wireless lock function or using the mechanical key in mechanical manner.

At S21, the transmitting processor 231 performs a wakeup request process, and proceeds to S22. In the wakeup request process, the transmitting processor 231 transmits the wakeup signal via the vehicle side transmitter 21.

At S22, when the receiving processor 232 receives the response signal from the mobile device 1 via the vehicle side receiver 22 (S22: YES), the process proceeds to S23. When the receiving processor 232 fails to receive the response signal (S22: NO), the process proceeds to S30. For example, the response signal transmitted from the mobile device 1 in response to the wakeup signal may be the same in all of the mobile devices 1. Further, when the multiple mobile devices 1 send the response signals at the same time point, the receiving processor 232 is configured to receive multiple response signals transmitted from multiple mobile devices 1 simultaneously without occurrence of receiving error. When the receiving processor 232 receives no response signal for a predetermined time period, it is determined that the receiving processor 232 fails to receive the response signal.

At S23, the transmitting processor 231 performs a first request process, and proceeds to S24. In the first request process, the transmitting processor 231 transmits a first request signal via the vehicle side transmitter 21. The first request signal designates one of the registered mobile devices 1. The transmitting processor 231 corresponds to an in-compartment transmitting section. The designated mobile device 1 may be a mobile device 1 having the smallest value of the registration number.

Each door of the vehicle may be locked using the wireless lock function of the mobile device 1. When the registration number or the ID code of the mobile device 1 used to lock the doors is specified by the receiving processor 232, the mobile device 1 used to lock the doors may be excluded from the mobile devices 1 one of which is to be set as the designated mobile device 1 by the first request signal. The mobile device 1 used to lock the doors based on the wireless lock function is supposed to carried by the user of the vehicle who has exit the vehicle. Thus, it is considered that the mobile device 1 used to lock the door has substantially low possibility being left in the vehicle compartment. As described above, except the mobile device 1 carried by the user who has exited the vehicle, one of remaining mobile devices 1 is designated by the first request signal. This configuration can reduce a determination time required for determining whether all of the registered mobile devices 1 being locked in the vehicle compartment.

At S24, when the receiving processor 232 receives the ID code of the mobile device 1 designated by the first request signal via the vehicle side receiver 22 (S24: YES), the receiving processor 232 determines that a corresponding response has been received, and proceeds to S25. When the receiving processor 232 fails to receive the ID code of the mobile device 1 designated by the first request signal (S24: NO), the process proceeds to S27.

When the receiving processor 232 receives no ID code for a predetermined time period, it is determined that the receiving processor 232 fails to receive the ID code. Herein, the predetermined time period may be set as the following. The receiving processor 232 may preliminarily store information for setting the first predetermined time point and set the predetermined time period based on a responding time point of the ID code estimated from the first predetermined time point.

At S25, when the receiving processor 232 receives the non-target response code via the vehicle side receiver 22 (S25: YES), the receiving process 232 determines that a non-corresponding response has been received, and proceeds to S27. When the receiving processor 232 receives no non-target response code (S25: NO), the receiving process 232 proceeds to S26. The receiving processor 232 corresponds to a vehicle side receiving section.

When the receiving processor 232 has not received the non-target response code for a predetermined time period, it is determined that the receiving processor 232 receives no non-target response code. Herein, the predetermined time period may be set as the following. The receiving processor 232 may preliminarily store information for setting the second predetermined time point and set the predetermined time period based on a responding time point of the non-target response code estimated from the second predetermined time point.

As described above, the non-target response code from the mobile device 1 in response to the first request signal is the same among all of the mobile devices 1. Thus, when the non-target response codes are transmitted from multiple mobile devices 1 at the same time, no receiving error is occurred.

At S26, the locked-in determiner 233 performs a first determination process, and ends the comparison process. In the first determination process, the locked-in determiner 233 determines that, among the registered mobile devices 1, only the mobile device 1 designated by the first request signal is locked in the vehicle compartment. Then, the locked-in determiner 233 stores the ID code of the locked-in mobile device 1 in a nonvolatile memory provided by an electrically rewritable nonvolatile memory, such as backup RAM.

At S27, the transmitting processor 231 performs a second request process, and proceeds to S28. In the second request process, the transmitting processor 231 transmits the second request signal, which designates all of the remaining registered mobile devices 1 except the mobile device 1 designated by the first request signal, via the vehicle side transmitter 21. Herein, details of the second request signal have been described in above description.

Each door of the vehicle may be locked using the wireless lock function of the mobile device 1. When the registration number or the ID code of the mobile device 1 used to lock the doors is specified by the receiving processor 232, the mobile device 1 used to lock the doors may be excluded from the mobile devices 1 to be set as the designated mobile devices 1 by the second request signal. As described above, the mobile devices 1 other than the one carried by the user who has exited the vehicle are designated by the second request signal. This configuration can reduce a determination time required for determining whether all of the registered mobile devices being locked in the vehicle compartment.

At S28, the receiving processor 232 determines whether all of the ID codes, which are transmitted from the mobile devices 1 designated by the second request signal, have been received. When the receiving processor 232 determines that all of the ID codes have been received (S28: YES), the receiving processor 232 determines a completion of all of the responses, and proceeds to S29. When the receiving processor 232 determines that all of the ID codes have not been received (S28: NO), the receiving processor 232 repeatedly execute S28.

When a next receiving of the ID code does not occur for a predetermined time period, the receiving processor 232 may determine that all of the ID codes have been received. As another example, the receiving processor 232 may calculate a minimum time period required for receiving the ID codes from all of the remaining mobile devices 1 except the mobile device 1 designated by the first request signal. Then, the receiving processor 232 may determine that the ID codes from all of the mobile devices 1 designated by the second request signal have been received when the calculated minimum time period has elapsed.

At S29, the locked-in determiner 233 performs a second determination process, and ends the comparison process. In the second determination process, the locked-in determiner 233 determines that the mobile device 1 corresponding to the received ID code in response to the second request signal is locked in the vehicle compartment. When the ID code in response to the first request signal has been received at S24, the locked-in determiner 233 determines that, in addition to the mobile device 1 corresponding to the received ID code, the mobile device 1 designated by the first request signal is also locked in the vehicle compartment. Then, the locked-in determiner 233 stores the ID codes of the locked-in mobile devices 1 in a nonvolatile memory provided by an electrically rewritable nonvolatile memory, such as backup RAM.

At S30, the locked-in determiner 233 performs a third determination process, and ends the process. In the third determination process, the locked-in determiner 233 determines no registered mobile device 1 is locked in the vehicle compartment.

By performing above-described comparison process in the vehicle compartment, the ID code for identifying the locked-in mobile device 1 can be acquired and stored when the doors of the vehicle are locked with the mobile device 1 left in the vehicle compartment.

The vehicle side unit 2 stores the ID code of the mobile device 1 that has been locked in the vehicle compartment. Thus, when a driver enters the vehicle and manipulates an engine switch, the vehicle side unit 2 can determine whether the driver carries another mobile device 1 that is different from the mobile device 1 being left in the vehicle compartment. That is, when only the mobile device 1 being left in the vehicle compartment communicates with the vehicle side unit 2, the vehicle side unit 2 can determine that the driver does not carry another mobile device 1 different from the mobile device 1 being left in the vehicle compartment.

In above-described case, the vehicle side unit 2 forbids the engine start in order to guarantee a security of the vehicle. When another mobile device 1 different from the mobile device being left in the vehicle compartment communicates with the vehicle side unit 2, the vehicle side unit 2 determines that the driver carries another authorized mobile device 1 different from the mobile device 1 being left in the vehicle compartment. In this case, the vehicle side unit 2 permits the engine start. As described above, the engine start instructed by the mobile device 1 being left in the vehicle compartment is forbidden, and the security of the vehicle can be improved.

Figure 6A:
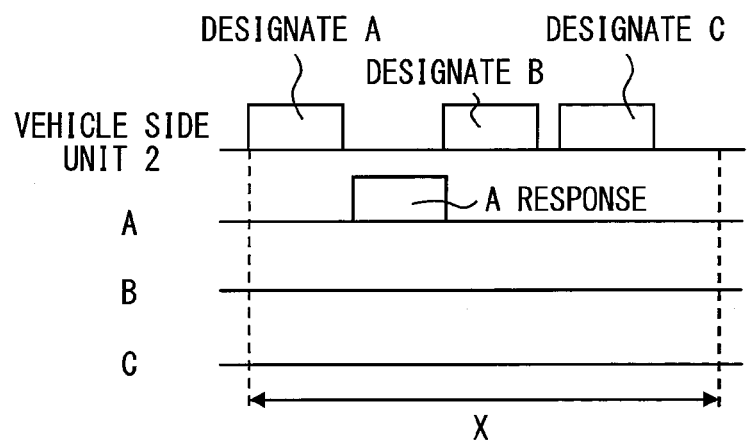
FIG. 6A and FIG. 6B are diagrams showing examples for describing advantages provided by the present disclosure.
Figure 6B:
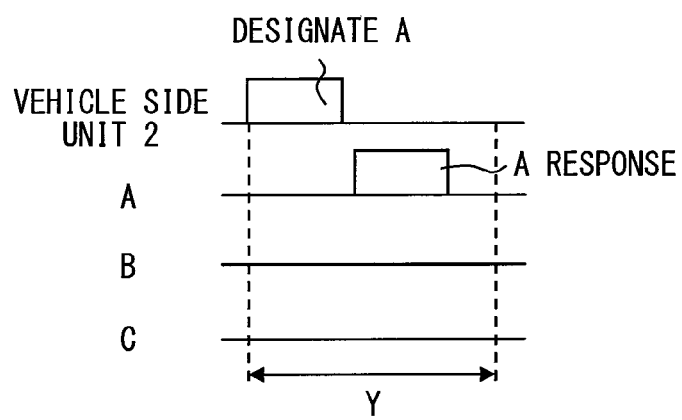

The following will describe advantages provided by the present disclosure with reference to FIG. 6A and FIG. 6B. As shown in FIG. 6A, the vehicle side unit 2 has three mobile devices 1 that have been registered to the vehicle side unit 2. In FIG. 6A, A, B, C indicate three different mobile devices 1. The mobile device 1 usually transmits the response only when the received request signal designates the mobile device 1 itself. In this configuration, even when only the mobile device A has been left in the vehicle compartment, the request signal designating the mobile device A is transmitted to the three mobile devices A, B, C in order, then the request signal designating the mobile device B is transmitted to the three mobile devices A, B, C in order, and then the request signal designating the mobile device C is transmitted to the three mobile devices A, B, C in order as shown in FIG. 6A. Thus, in the configuration shown in FIG. 6A, time period is required for transmitting each of the request signals designating respective mobile devices A, B, C to all of the mobile devices A, B, C repeatedly and determining presence or absence of the response from each of the mobile devices A, B, C in response to each transmission of the request signal (time period X shown in FIG. 6A).

According to above-described configuration of first embodiment, absence of non-target mobile devices 1 in the vehicle compartment can be determined based on no reception of the non-target response code in response to the first request signal. Herein, the non-target mobile devices 1 are the mobile devices 1 other than the mobile device 1 designated by the first request signal. Thus, when only the mobile device A is left in the vehicle compartment, there is no need to transmit the request signals each designating B and C, respectively, and there is also no need to determine presence or absence of the response from each of the mobile devices A, B, C (refer to FIG. 6B). As described above, compared with a case in which the request signal designating one mobile device is repeatedly transmitted to each of the registered mobile devices 1 for determining the presence or absence of the mobile device 1 in the vehicle compartment, a determination time required for determining whether all of the registered mobile devices 1 being left in the vehicle compartment can be reduced (refer to the time period Y shown in FIG. 6B).

Second Embodiment

The present disclosure is not limited to the above-mentioned first embodiment, and also includes a second embodiment described below. The following will describe the second embodiment. In the following description, configurations or functions similar to the above-described embodiments or modifications are omitted for simplification, and the same reference symbol is used for the same or equivalent part.

A vehicular system 100 according to the second embodiment is similar to the vehicular system 100 according to the first embodiment except the response process executed by the mobile controller 13 of the mobile device 1 and comparison process executed by the comparing ECU 23 of the vehicle side unit 2 in the vehicle compartment.

Figure 7:
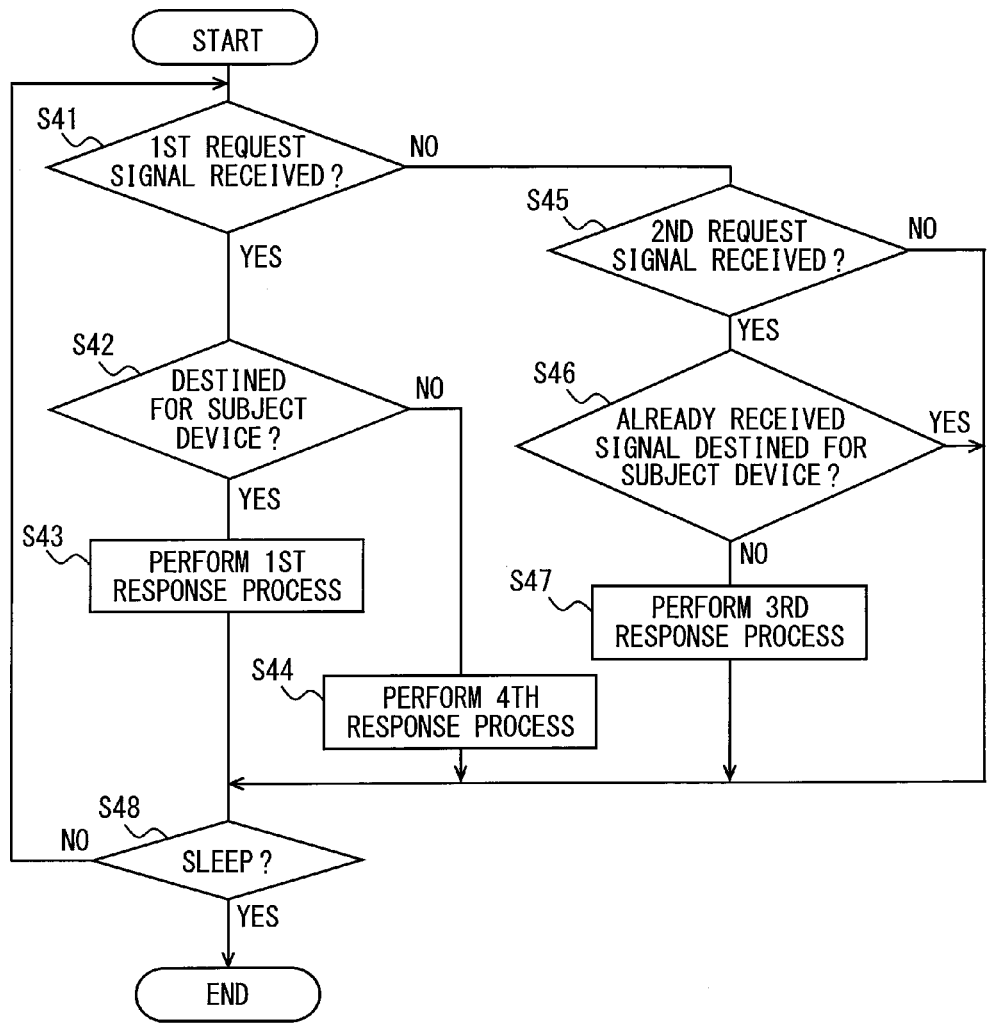
FIG. 7 is a flowchart showing an example of a response process executed by a mobile controller of a mobile device according to a second embodiment.

The following will describe the response process executed by the mobile controller 13 according to the second embodiment with reference to FIG. 7. In the flowchart shown in FIG. 7, processes executed at S41 to S43 are similar to the processes executed at S1 to S3. Further, processes executed at S45 to S48 are similar to the processes executed at S5 to S8.

At S44, the transmitting processor 131 performs a fourth response process, and proceeds to S48. In the fourth response process, the transmitting processor 131 transmits the non-target response code to the vehicle side unit 2 via the transmitting section 12. In the present embodiment, the non-target response codes of the mobile devices 1 are different from one another. For example, in the present embodiment, the non-target response code may be set as the ID code, the registration number or another code of the mobile device 1.

In the fourth response process, the non-target response code is transmitted to the vehicle side unit 2 at a second predetermined time point that is later than the first predetermined time point by a predetermined time period. The non-target response code transmitted in the fourth response process corresponds to a non-designated report signal. In the second embodiment, the mobile devices 1, which receive the first request signal designating another mobile device 1, transmit different response signals at the same time point.

Figure 8:
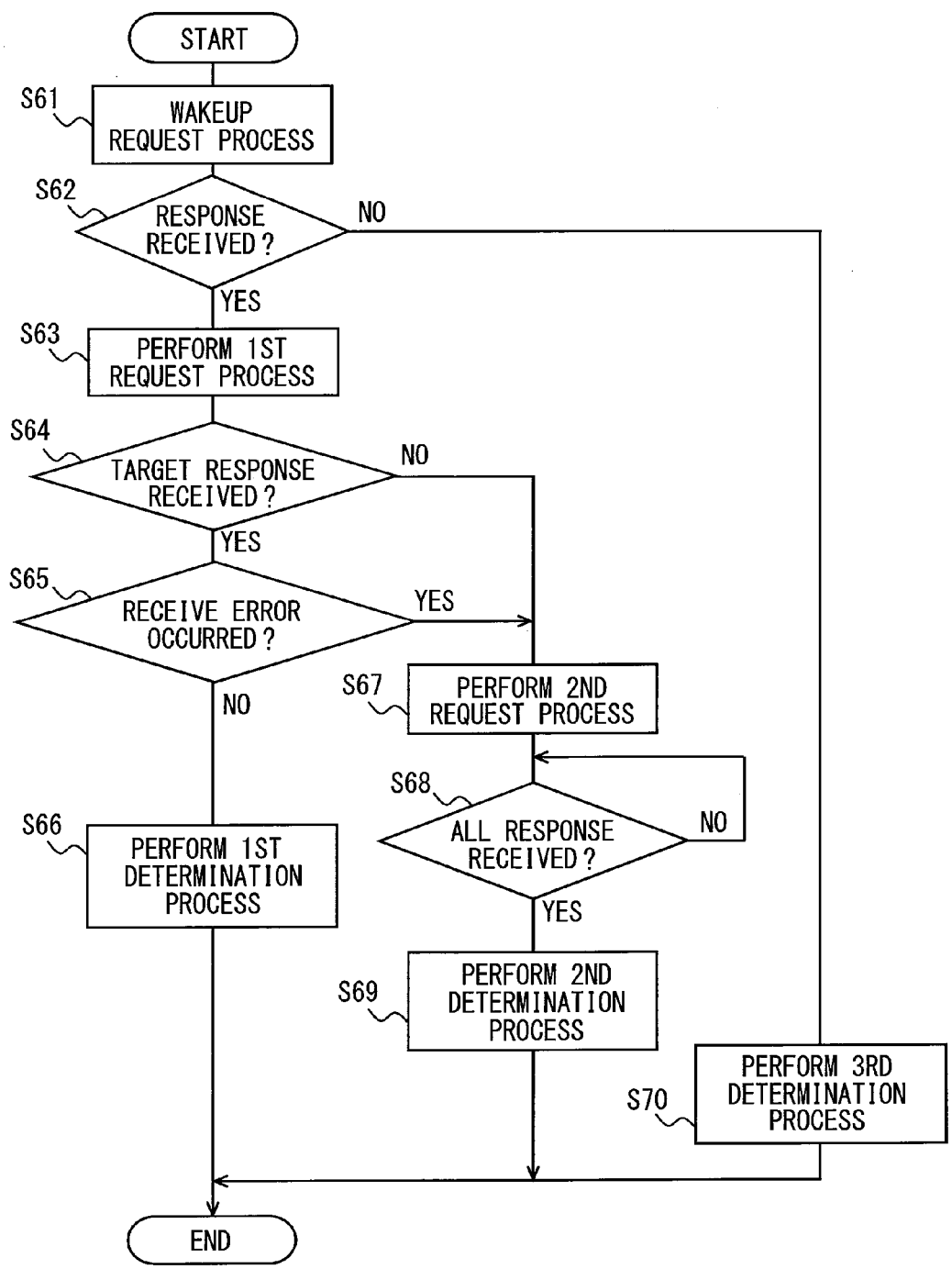
FIG. 8 is a flowchart showing an example of a comparison process executed, in the vehicle compartment, by a comparing ECU of a vehicle side unit according to the second embodiment.

The following will describe a response process executed by the mobile controller 13 according to the second embodiment with reference to the flowchart shown in FIG. 8. In the flowchart shown in FIG. 8, processes executed at S61 to S64 are similar to the processes executed at S21 to S24. Further, processes executed at S66 to S70 are similar to the processes executed at S26 to S30.

At S65, when a receiving error occurs in the receiving processor 232 (S65: YES), the process proceeds to S67. When there is no receiving error occurred in the receiving processor 232 and no response signal is received (S65: NO), the process proceeds to S66.

When the receiving processor 232 receives no response signal for a predetermined time period, it is determined that no response signal is received by the receiving processor 232. Herein, the predetermined time period may be set as the following. The receiving processor 232 may preliminarily store information for setting the second predetermined time point and set the predetermined time period based on a responding time point of the response signal estimated according to the second predetermined time point.

As described above, the response signals, which are made by the mobile devices 1 at the second predetermined time point in response to the first request signal, are different from one another. Thus, when receiving the simultaneously transmitted response signals from multiple mobile devices 1, a receiving error may occur in the receiving processor 232.

At S66, when the ID code of the mobile device 1 designated by the first request signal is received and the ID code of the mobile device 1 that is not designated by the first request signal is received, the vehicle side unit 2 may determine that the mobile devices corresponding to the received ID codes are left in the vehicle compartment. This is because, except the mobile device 1 designated by the first request signal, when there exist only another one mobile device 1 in the vehicle compartment, the receiving error does not occur and the ID code of the mobile device 1 that is not designated by the first request signal can be received without receiving error.

Similar to the first embodiment, compared with a case in which the request signal designating one mobile device is repeatedly transmitted to each of the registered mobile devices 1 for determining the presence or absence of the mobile device 1 in the vehicle compartment, a determination time required for determining whether all of the registered mobile devices 1 being left in the vehicle compartment can be reduced according to the configuration of the second embodiment.

While the disclosure has been described with reference to preferred embodiments thereof, it is to be understood that the disclosure is not limited to the preferred embodiments and constructions. The disclosure is intended to cover various modification and equivalent arrangements. In addition, while the various combinations and configurations, which are preferred, other combinations and configurations, including more, less or only a single element, are also within the spirit and scope of the disclosure.

What is claimed is:

1. A vehicular system comprising:
a vehicle side unit equipped to a vehicle; and
a plurality of mobile devices preliminarily registered to the vehicle side unit, wherein
the plurality of mobile devices at least include a first mobile device and the mobile devices other than the first mobile device being referred to as remaining mobile devices,
the vehicle side unit includes an in-compartment transmitting section that has a communication area covering an inside space of a compartment of the vehicle and transmits a first request signal designating the first mobile device,
each of the plurality of mobile devices includes a replying section,
the replying section of the first mobile device replies a response signal when receiving the first request signal,
the replying section of each of the remaining mobile devices replies a predetermined non-designated report signal when receiving the first request signal, the replying section of each of the remaining mobile devices replies the non-designated report signal at a time point earlier or later than a time point at which the replying section of the first mobile device replies the response signal by a predetermined time period, and
the vehicle side unit further includes:
a vehicle side receiving section receiving the signal transmitted from the replying section of each of the plurality of mobile devices; and
a locked-in determiner determining that, among the plurality of mobile devices, only the first mobile device is locked in the compartment of the vehicle when the vehicle side receiving section receives the response signal from the first mobile device in response to the first request signal and the non-designated report signal is not received by the vehicle side receiving section.

2. The vehicular system according to claim 1, wherein
the non-designated report signals transmitted from the plurality of mobile devices are identical with one another.

3. The vehicular system according to claim 2, wherein
each of the plurality of mobile devices is assigned with an individual number and the individual number of each of the plurality of mobile devices is preliminarily stored in the vehicle side unit,
each of the plurality of mobile devices includes a number storage storing the individual number,
when the vehicle side receiving section, in response to the first request signal, receives both the response signal and the non-designated report signal or receives only the non-designated report signal without receiving the response signal, the in-compartment transmitting section of the vehicle side unit transmits a second request signal designating all of the mobile devices except the first mobile device among the plurality of mobile devices with the inside space of the compartment of the vehicle as the communication area, when each of the mobile devices except the first mobile device receives the second request signal, the replying section of the corresponding mobile device transmits, at a time point defined according to the stored individual number of the corresponding mobile device, a response signal by which the corresponding mobile device is identifiable, and the locked-in determiner of the vehicle side unit determines that the mobile device identified by the response signal, which is received by the vehicle side receiving section in response to the second request signal, is locked in the compartment of the vehicle.

4. The vehicular system according to claim 1, wherein the non-designated report signals transmitted from the plurality of mobile devices are provided by different signals.

5. The vehicular system according to claim 4, wherein the non-designated report signal of each of the plurality of mobile devices is different from the response signal.

6. The vehicular system according to claim 4, wherein each of the plurality of mobile devices is assigned with an individual number and the individual number of each of the plurality of mobile devices is preliminarily stored in the vehicle side unit, each of the plurality of mobile devices includes a number storage storing the individual number, when the vehicle side receiving section, in response to the first request signal, receives the response signal from the first mobile device and detects a receiving error among response signals transmitted from the mobile devices except the first mobile device, or does not receive the response signal from the first mobile device and detects the receiving error among the response signals transmitted from the mobile devices except the first mobile device, the in-compartment transmitting section of the vehicle side unit transmits a second request signal designating all of the mobile devices except the first mobile device with the inside space of the compartment of the vehicle as the communication area, when each of the mobile devices except the first mobile device receives the second request signal, the replying section of the corresponding mobile device transmits, at a time point defined according to the stored individual number of the corresponding mobile device, the response signal by which the corresponding mobile device is identifiable, and the locked-in determiner of the vehicle side unit determines that the mobile device identified by the response signal, which is received by the vehicle side receiving section in response to the second request signal, is locked in the compartment of the vehicle.

7. The vehicular system according to claim 1, wherein the non-designated report signal of each of the plurality of mobile devices is identical with the response signal.

8. A mobile device which performs a communication with a vehicle side unit equipped to a vehicle, wherein the mobile device is preliminarily registered to the vehicle side unit and the vehicle side unit transmits a request signal which has a communication range within an inside space of a compartment of the vehicle, the mobile device comprising:
a replying section that replies, at a first time point, a response signal in response to the request signal from the vehicle side unit when the request signal from the vehicle side unit designates the mobile device, wherein, when the request signal from the vehicle side unit designates a different mobile device, the replying section replies, at a second time point, a non-designated report signal in response to the request signal from the vehicle side unit, and the second time point is earlier or later than the first time point by a predetermined time period.

9. The vehicular system according to claim 1, wherein the replying sections of the remaining mobile devices simultaneously reply the non-designated report signals to the vehicle side unit at a predetermined time point in response to the first request signal, and the predetermined time point is earlier or later than the time point at which the replying section of the first mobile device replies the response signal by a predetermined time period.

10. A vehicle side unit which is equipped to a vehicle and performs communications with a plurality of mobile devices, wherein the plurality of mobile devices are preliminarily registered to the vehicle side unit, the plurality of mobile devices at least include a first mobile device, and the mobile devices other than the first mobile device among the plurality of mobile devices are referred to as remaining mobile devices, the vehicle side unit comprising:
an in-compartment transmitting section that has a communication area covering an inside space of a compartment of the vehicle and transmits a first request signal designating the first mobile device, wherein the first mobile device replies a response signal in response to the first request signal at a first time point, each of the remaining mobile devices replies a predetermined non-designated report signal in response to the first request signal at a second time point, and the second time point is earlier or later than the first time point by a predetermined time period;

a vehicle side receiving section that receives the response signal or the non-designated report signal transmitted from the replying section of each of the plurality of mobile devices; and a locked-in determiner that determines, among the plurality of mobile devices, only the first mobile device is locked in the compartment of the vehicle when the vehicle side receiving section receives the response signal from the first mobile device in response to the first request signal and the non-designated report signal is not received by the vehicle side receiving section.

* * * * *